United States Patent
Dani (10) Patent No.: US 10,480,110 B2
(45) Date of Patent: Nov. 19, 2019

(54) MELAMINE WIPES AND METHODS OF MANUFACTURE

(71) Applicant: THE CLOROX COMPANY, Oakland, CA (US)

(72) Inventor: Nikhil P. Dani, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 225 days.

(21) Appl. No.: 15/728,348

(22) Filed: Oct. 9, 2017

(65) Prior Publication Data

US 2019/0106820 A1   Apr. 11, 2019

(51) Int. Cl.
| | |
|---|---|
| *D04H 1/492* | (2012.01) |
| *D04H 3/11* | (2012.01) |
| *D04H 1/46* | (2012.01) |
| *D04H 1/498* | (2012.01) |
| *A47L 13/16* | (2006.01) |
| *B32B 5/24* | (2006.01) |

(52) U.S. Cl.
CPC .............. *D04H 1/492* (2013.01); *A47L 13/16* (2013.01); *B32B 5/245* (2013.01); *D04H 1/46* (2013.01); *D04H 1/498* (2013.01); *D04H 3/11* (2013.01)

(58) Field of Classification Search
CPC ........ D04H 1/492; D04H 1/495; D04H 1/498; D04H 1/46; D04H 3/11; D04H 1/4374; D04H 1/465; D04H 5/03; D04H 18/04; D04H 1/49; D04H 13/003; B32B 5/245; A47L 13/10; A47L 13/16
USPC .................... 28/104, 105; 442/384, 387, 408
See application file for complete search history.

(56) References Cited

U.S. PATENT DOCUMENTS

| | | | | |
|---|---|---|---|---|
| 5,534,325 | A * | 7/1996 | Jorder | B32B 5/02 428/102 |
| 6,764,971 | B2 * | 7/2004 | Kelly | D04H 3/11 28/104 |
| 8,490,259 | B2 * | 7/2013 | Hartgrove | D04H 1/495 28/103 |
| 2002/0023326 | A1 * | 2/2002 | Hartgrove | B24D 11/001 28/105 |
| 2002/0098753 | A1 * | 7/2002 | Latham | B32B 5/26 442/50 |
| 2002/0160676 | A1 * | 10/2002 | Putnam | A41D 31/02 442/105 |

(Continued)

*Primary Examiner* — Amy Vanatta
(74) *Attorney, Agent, or Firm* — Erin Collins (57) ABSTRACT

Methods for manufacturing wipes including melamine entangled into a nonwoven, and associated articles of manufacture. Such a method may include providing a melamine sheet (e.g., contiguous, rather than discrete melamine particles), providing first and second nonwoven sheets, and positioning the melamine sheet between the first and second nonwoven sheets. The sandwich structure is hydro-entangled at high pressure to force the melamine material to become entangled into the nonwoven material, to a degree that a portion of the melamine is actually exposed on the exterior face(s) of the wipe, which are generally provided by the nonwoven sheets. Such a wipe exhibits the drapability of a wipe, with the scrubbing benefits (e.g., very effective cleaning of baseboards, crayon off walls, etc.) of melamine, with greater durability than existing melamine cleaning articles, which tend to quickly crumble during use.

18 Claims, 10 Drawing Sheets

(56) References Cited

U.S. PATENT DOCUMENTS

| | | | | |
|---|---|---|---|---|
| 2005/0118918 A1* | 6/2005 | Schafer | ................... | D04H 1/02 |
| | | | | 442/408 |
| 2005/0136238 A1* | 6/2005 | Lindsay | ................. | A47L 13/16 |
| | | | | 428/304.4 |
| 2005/0266230 A1* | 12/2005 | Hill | ....................... | A47L 13/16 |
| | | | | 428/317.9 |
| 2010/0257685 A1* | 10/2010 | Tuman | .................... | A47L 13/16 |
| | | | | 15/244.4 |
| 2013/0030340 A1* | 1/2013 | Vincent | ............... | B01D 39/163 |
| | | | | 602/42 |
| 2014/0242324 A1* | 8/2014 | Jones | .................... | D04H 1/498 |
| | | | | 428/88 |
| 2014/0273705 A1* | 9/2014 | Lawrence | ................. | B32B 5/18 |
| | | | | 442/370 |
| 2015/0143647 A1* | 5/2015 | Yang | ....................... | A47L 13/16 |
| | | | | 15/104.93 |
| 2016/0000291 A1* | 1/2016 | Calderas | ................. | C11D 3/14 |
| | | | | 15/229.12 |

\* cited by examiner

MELAMINE WIPES AND METHODS OF MANUFACTURE

BACKGROUND OF THE INVENTION

1. The Field of the Invention

The present invention relates to methods of manufacturing a wipe including melamine that has been entangled into a nonwoven or other fibrous material, as well as related articles of manufacture.

2. Description of Related Art

Melamine cleaning articles are available, e.g., such as that provided under the tradename MAGIC ERASER. Such melamine cleaning articles are particularly good at removing crayon from walls, removing scuff marks from baseboards, and the like. While existing melamine cleaning articles are quite useful, they exhibit some drawbacks, such as lack of durability, as the melamine cleaning article tends to disintegrate or "crumble" in relatively short order during use. In addition, melamine cleaning articles do not exhibit any significant degree of drapability, as would a cleaning wipe, which can be desirable when attempting to reach into hard to reach areas, such as corners, crevices, and the like. As such, there is a continuing need for improved cleaning articles that comprise melamine, as well as methods for their manufacture.

BRIEF SUMMARY

The present invention relates to methods for manufacturing wipes including melamine which becomes entangled into a nonwoven or other fibrous material, as well as related articles of manufacture. According to one embodiment, a method of wipe manufacture includes providing a melamine sheet, providing first and second nonwoven sheets, and hydro-entangling the melamine sheet into at least one of the nonwoven sheets such that the melamine is entangled through at least one of the nonwoven sheets, such that a portion of the melamine is exposed on an exterior face of the wipe, which face is generally provided by the nonwoven sheets. While use of nonwoven sheets as the outer "sandwich" layers may be preferred, it will be appreciated that other embodiments may not necessarily be limited to nonwoven sheets, but that other fibrous materials could alternatively be used.

Another method of manufacturing a wipe includes providing a melamine sheet in which the melamine sheet material is provided as a contiguous sheet, rather than in the form of discrete melamine particles. First and second nonwoven sheets are also provided, and the melamine sheet is positioned between (e.g., sandwiched between) the first and second nonwoven sheets. For the manufacturing method, the nonwoven sheets and melamine sheet materials may be provided as rolls of such material which are unwound and fed into the manufacturing process, e.g., which may later be cut to the desired size of the finished wipe. This sandwich structure is then subjected to hydro-entangling, whereby water-jets hydro-entangle the melamine sheet into at least one (preferably both) of the nonwoven sheets. The result is that a portion of the melamine is exposed on at least one (and preferably both) of the exterior faces of the wipe. The hydro-entangling is performed at a pressure of more than 100 bars, or at least 150 bars, e.g., depending on the thickness of the melamine, the characteristics of the nonwoven layers, or the like.

Wipes produced according to the present invention may include a melamine sheet in which the melamine is provided as a contiguous sheet, rather than in the form of discrete melamine particles. The wipe is such that the melamine sheet is sandwiched between first and second nonwoven sheets positioned on either side of the melamine sheet, wherein the melamine sheet is entangled into at least one, and preferably both of the nonwoven sheets, such that a portion of the melamine is exposed on at least one, and preferably both exterior faces of the wipe. Such a wipe may be substantially void of melamine particles, and/or any binder (e.g., a melt flow adhesive) that may otherwise be used for adhering the melamine to the nonwoven sheets.

For example, while U.S. Publication No. 2008/0003906 to the present Applicant (U.S. Publication No. 2008/0003906 is herein incorporated by reference in its entirety) discloses incorporation of melamine particles into a wipe or cleaning pad including a nonwoven layer, it was found that such methods of production were impractical as the melamine particles would become entrained within the process water, quickly clogging filters, and making continuous production processes highly inefficient and cost prohibitive. Furthermore, location of the melamine particles within the interior of the wipe or cleaning pad did not provide the desired melamine cleaning action on the exterior surface, as the entire exterior surface was provided by the nonwoven material. Finally, even if a melamine foam layer were provided on an exterior surface, such melamine exterior surface quickly eroded and disintegrated away during use, no better than results provided by existing Melamine cleaning pads, such as MAGIC ERASER.

The present embodiments instead ensure that no melamine particles are used, so as to facilitate manufacture through a continuous production process, and in which the melamine material generally makes up a core of the cleaning wipe, but in which the cleaning wipe is not really layered, with discrete layers, but in which the melamine is present also on the exterior faces of the wipe, entangled within the nonwoven material, "poking" through the nonwoven, so as to provide some melamine on the exterior face(s) of the wipe. At the same time, no exterior face of the wipe is provided exclusively by melamine, but the exterior faces are generally (e.g., mostly) provided by the nonwoven material, but in which the melamine sheet has been entangled with the nonwoven, such that portions of the melamine penetrate through to the exterior face of the wipe. Because the exterior face of the wipe is largely provided by the nonwoven, with protruding melamine portions, the wipe is far more durable than existing melamine wipe products in which melamine cleaning action is provided by a face that consists of or consists essentially of melamine.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Definitions

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting" essentially of limits the scope of a claim to the specified materials or steps "and those that do not materially affect the basic and novel characteristic(s)" of the claimed invention.

The term "consisting" of as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, where used, the terms "substantially", "similarly", "about" or "approximately" represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%. In some embodiments, the compositions or articles described herein may be free or substantially free from any components not mentioned within this specification.

As used herein, "disposable" is used in its ordinary sense to mean an article that is disposed or discarded after a limited number of usage events, preferably less than 25, more preferably less than about 10, and most preferably less than about 2 entire usage events. The wipes disclosed herein are typically disposable.

As used herein, the term "substrate" is intended to include any material that is used to clean an article or a surface. Examples of cleaning substrates include, but are not limited to, wipes, mitts, sponges, pads, or a single sheet of material which is used to clean a surface by hand or a sheet of material which can be attached to a cleaning implement, such as a floor mop, handle, or a hand held cleaning tool, such as a toilet cleaning device. The term "substrate" is also intended to include any material that is used for personal cleansing applications. The term "substrate" is also intended to include any material that is used for personal care absorption applications, for example a diaper. These substrates can be used for hard surface, soft surface, and personal care applications. Such substrates may typically be in the form of a wipe. Such substrates or wipes may be attachable to a given cleaning tool, e.g., where the wipes or other substrates attachable thereto may be used for their useful life, and then disposed of, and replaced with another.

As used herein, the term "fibrous layer" means a web having a structure of individual fibers or threads which are interlaid, in an identifiable manner as in a knitted or woven layer or not in an identifiable manner as in a nonwoven layer. The examples herein may generally include a fibrous layer that is nonwoven. Nonwoven layers have been formed from many processes, such as, for example, carded, airlaid, wet-laid, spunbond, meltblown, hydro-entangled, hydrospun, thermal bonded, air-through bonded, needled, chemical bonded, and latex bonded web processes. The basis weight of nonwoven webs or rolls is often expressed in grams per square meter (gsm) and the fiber diameters useful are usually expressed in microns, or in the case of staple fibers, denier.

The terms "wipe" "substrate", and "fibrous layer" may thus overlap in meaning, and while "wipe"may typically be used herein for convenience, it will be appreciated that this term may be interchanged with "substrate" or "fibrous layer"

As used herein, "wiping" refers to any shearing action that the wipe or other substrate undergoes while in contact with a target surface. This includes hand or body motion, substrate-implement motion over a surface, or any perturbation of the substrate via energy sources such as ultrasound, mechanical vibration, electromagnetism, and so forth.

As used herein, the term "fiber" includes both staple fibers, i.e., fibers which have a defined length between 2 mm and 20 mm, fibers longer than staple fibers but are not continuous, as well as continuous fibers, which are sometimes called "continuous filaments" or simply "filaments". The method in which the fiber is prepared may affect whether the fiber is a staple fiber or a continuous filament.

As used herein, the term "foam" is generally in reference to a melamine foam material, which is included in the disclosed wipes or other substrates. Foams may include solid porous foams, reticulated foams, water-disintegratable foams, open-cell foams, closed-cell foams, foamed synthetic resins, cellulosic foams, and natural foams.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

In an aspect, the present invention is directed to methods for manufacturing a wipe comprising a melamine sheet or layer that is entangled with a nonwoven component. Advantageously, at least a portion of the melamine is entangled in a manner that it protrudes from the nonwoven material, so that portions of the melamine are exposed on the exterior face of the wipe. Such melamine exposure, largely surrounded by the nonwoven material, provides significantly better durability, while at the same time providing cleaning advantages associated with exposed melamine. In addition, the cleaning article exhibits good drapability, similar to a typical nonwoven wipe.

Such a process may include providing a melamine sheet material, providing first and second nonwoven sheet materials, positioning the melamine sheet between the first and second nonwoven sheets, and hydro-entangling the melamine sheet into at least one of the nonwoven sheets such that a portion of the melamine is exposed on an exterior face of the wipe, which face is otherwise provided by the nonwoven sheet.

III. Exemplary Methods of Manufacture

Figure 1A:
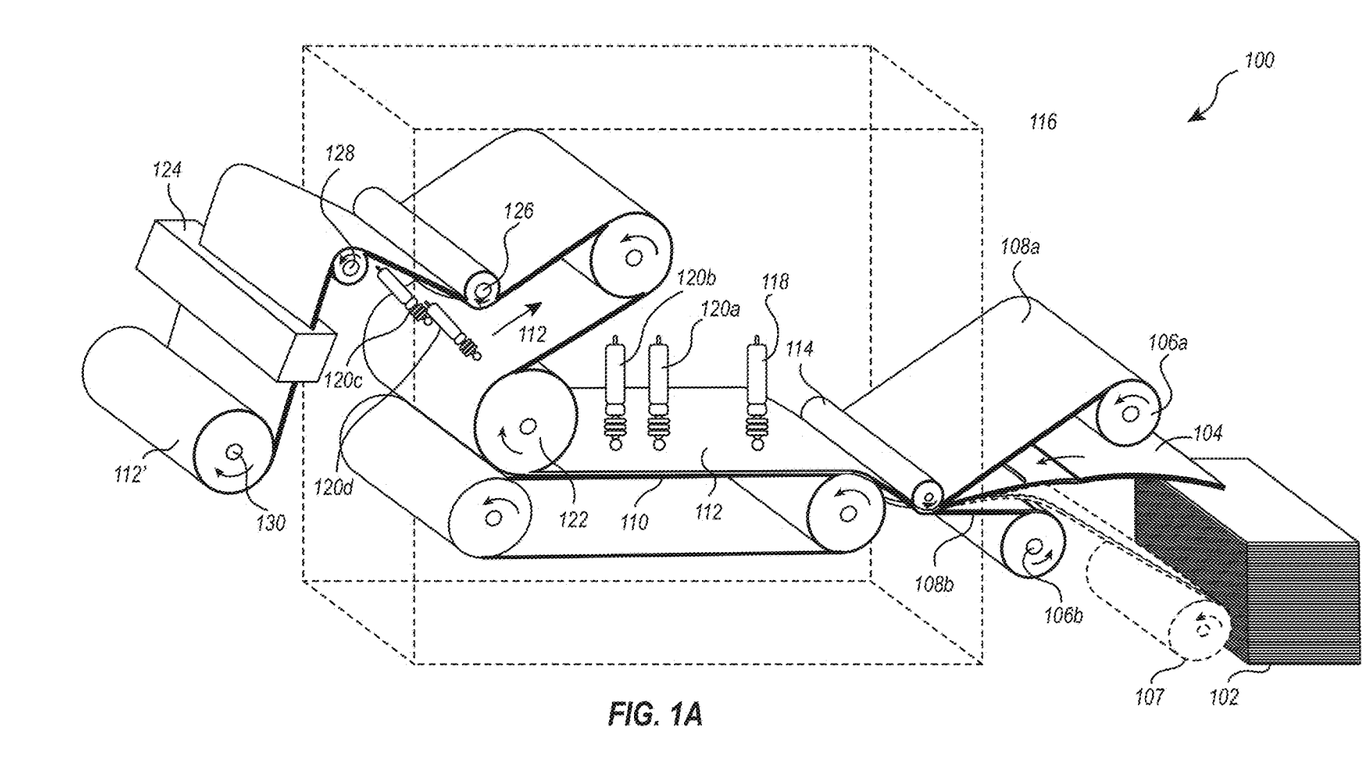
FIG. 1A is a schematic view of an exemplary process and apparatus for manufacturing wipes or other substrates, according to the present invention.
Figure 1B:
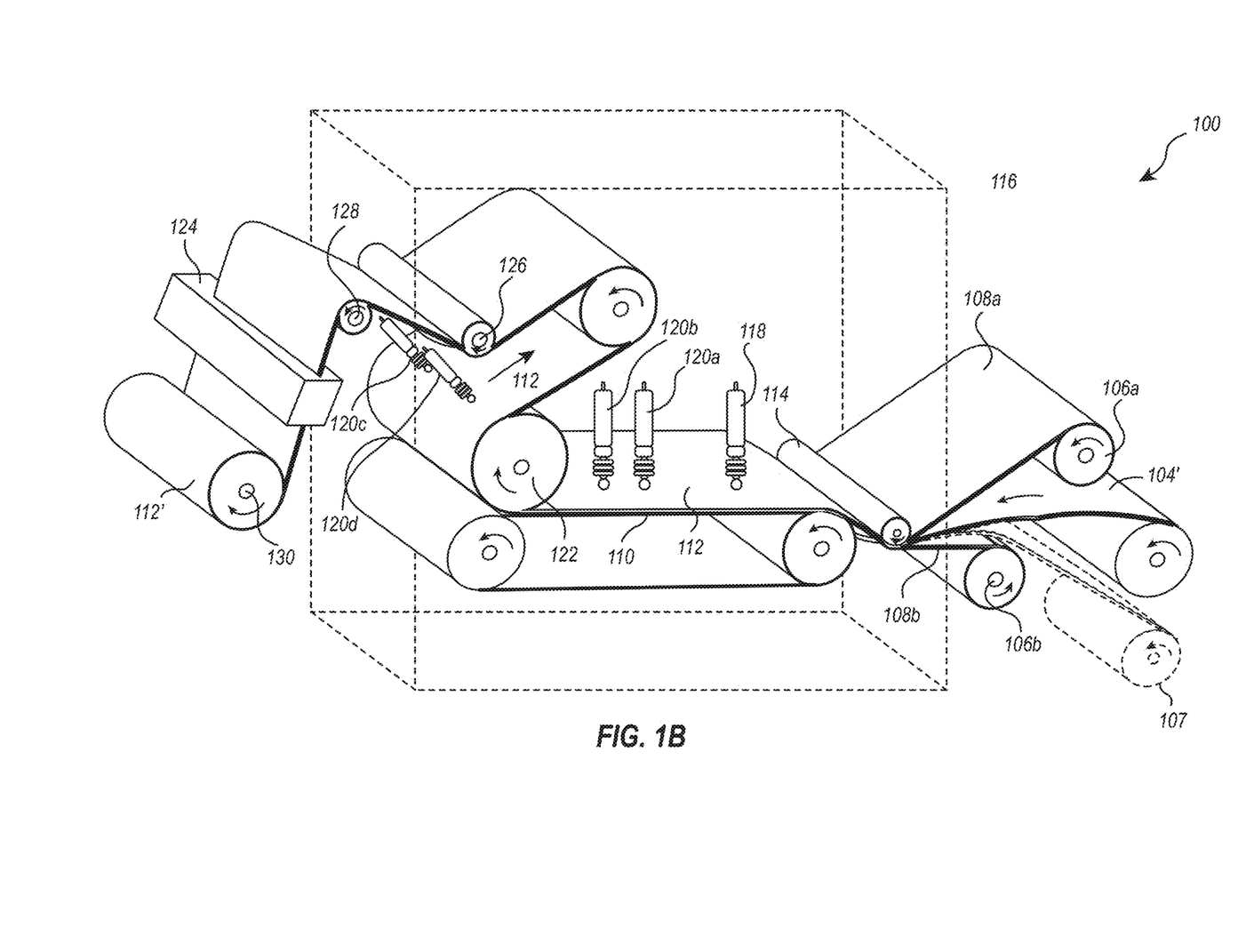
FIG. 1B shows a schematic view of another exemplary process and apparatus for manufacturing wipes or other substrates, according to the present invention.

FIGS. 1A-1B schematically illustrate an exemplary apparatus 100 for manufacture of wipes as described herein. FIG. 1A shows use of distinct, separate sheets of melamine 104, while FIG. 1B shows use of melamine as a rolled sheet 104'. Other forms are also possible, e.g., smaller sized sheets of melamine (e.g., as little as 0.5 inch in length or width), strips of melamine, non-continuous sheets of melamine (e.g. melamine sheets with cut outs of any suitable shapes, lines or other suitable patterns, such as a grid or repeating circle patterns, etc.), or the like. It will be apparent that a variety of materials and methods may suitably be employed. Apparatus 100 is shown as including a mechanism at 102 for feeding melamine sheet 104, as well as mechanisms 106a, 106b for providing first and second nonwoven sheets 108a, 108b. As shown in FIGS. 1A-1B, the melamine sheet 104 is sandwiched between nonwoven sheets 108a, 108b as it is fed into apparatus 100, along conveyor belt 110. Another optional layer 107 is also shown in FIGS. 1A-1B. The optional layer maybe an absorbent material with a high percentage of pulp fibers, such as a tissue material sheet, paper towel, a nonwoven material with at least 60% pulp fibers, preferably at least 70%, at least 90% or 100% pulp fibers. For example, if desired, a tissue layer could also be fed into the sandwiching of such layers. Sandwiched structure 112 (melamine 104 between nonwovens 108a, 108b) may pass under a roller 114 and then into chamber 116 where the hydro-entangling is performed. Structure 112 may first be pre-wetted (e.g., at spray heads 118). Such pre-wetting may be applied at a pressure that is insufficient to entangle the initially distinct layers 104, 108 (108a, 108b). For example, such a pressure may be at about 25 bars. More generally, such pressure may be less than 100 bars, less than 50 bars, from 1 to 50 bars, from 5 to 50 bars, from 10 to 50 bars, or from 20 to 30 bars water pressure.

After pre-wetting at 118, wetted structure 112 may proceed along conveyor 110 to spray heads or water jets 120a, 120b which water jets operate at a significantly higher pressure, in order to hydro-entangle the melamine 104 into one of nonwovens 108a or 108b. The water pressure is sufficient to not only cause tangling of the layers at the interface of the initially distinct layers, but to also cause portions of the melamine 104 to be pushed through the nonwoven layer, so that portions of melamine 104 are exposed along the exterior surface of the resulting finished wipe, as shown in the SEM images of FIGS. 2A-5B.

Hydro-entangling heads 120a-120d may operate at a water pressure of at least 100 bars, at least 125 bars, at least 150 bars, at least 175 bars, or at least 200 bars. The thickness and weight of the nonwoven layer(s), and/or the melamine material may have an effect on the required pressure in order to achieve good entangling that results in exterior surface exposure of the melamine, as described herein. Exemplary wipes were produced with 0.5 inch, 0.25 inch, and 0.125 inch melamine sheet and a relatively lightweight nonwoven spunbond outer layers, e.g., having a weight of only 10 gsm.

After passing hydro-entangling heads 120a, 120b, the structure 112 (which is now entangled on one face) passes to drum hydro-structure 122, which hydro-entangles the melamine into the remaining nonwoven layer (e.g., the other of 108a, or 108b, whichever was not hydro-entangled at 120a, 120b), e.g., using hydro-entangling heads 120c, 120d.

Upon exiting 122, the structure 112 may now exhibit melamine entangling so as to exhibit melamine exposure in both the top and bottom faces of the wipe structure. After such hydro-entangling, the structure can pass out of chamber 116, around rollers 126, 128, through dryer 124, finally being wound-up at 130.

Wipes or other substrates 112' produced according to the present invention advantageously may be formed using melamine that is in large, contiguous sheet or rolled sheet form, rather than very small melamine particles, which may somehow become impregnated within the wipe or other substrate. For example, U.S. Publication 2008/003906 describes use of foam particles having small diameters, typically less than 1 mm. Applicant has discovered that the use of such particles creates numerous difficulties from a processing perspective, as the particles (even if they initially start out as relatively large) become entrained within the process water employed in the production process, clogging filters, and necessitating frequent shut-downs. For this reason, melamine particles are not employed. The melamine may rather be provided in relatively large contiguous sheets, or as a large roll), for feeding to the process. Providing the melamine in such form will minimize sloughing off of melamine particles, which create a filter clogging problem. By way of example, the sheets employed may have a length and width at least equal to wipes or other substrates being produced (e.g., at least 4 inches, at least 6 inches, at least 10 inches, at least 12 inches, or the like). Smaller size sheets of melamine could possibly be used (e.g., feeding small sheets of melamine having length and width of at least 0.5 inch, 1 inch, 2 inches, or the like. Of course, larger sizes may be preferred, for ease of manufacturing. In an example, the melamine sheet need not necessarily be continuous in the finished wipe. For example, strips of melamine could be used, resulting in a wipe having sandwiched melamine strips therein. Sheets used in forming the examples described herein had dimensions of approximately 2 to 3 feet by 3 to 5 feet.

In an embodiment, the width of the melamine sheet fed into the process may be equal to or not more than the width of the sheet or roll of the nonwoven material. Such dimensions may aid in minimizing any sloughing off of melamine sheet material, and its entrainment into the process water.

The present embodiments instead ensure that no melamine particles are used, so as to facilitate manufacture through a continuous production process, and in which the melamine material generally makes up a core of the cleaning wipe, but in which the cleaning wipe is not really layered, with discrete layers, but in which the melamine is present also on the exterior faces of the wipe, entangled within the nonwoven material, "poking" through the nonwoven, so as to provide some melamine on the exterior face(s) of the wipe. At the same time, no exterior face of the wipe is provided exclusively by melamine, but the exterior faces are generally provided by the nonwoven material, but in which the melamine sheet has been entangled with the nonwoven, such that portions of the melamine penetrate through to the exterior face of the wipe. Because the exterior face of the wipe is largely provided by the nonwoven, with protruding melamine portions, the wipe is far more durable than existing melamine wipe products in which melamine cleaning action is provided by a face that consists of or consists essentially of melamine.

As shown in FIGS. 1A-1B, one or more additional layers may be provided. For example, an additional absorbent sheet or tissue layer 107 may optionally be provided, e.g., so as to be positioned adjacent the melamine layer 104. Such an additional layer 107 may comprise a tissue layer, e.g., including a high pulp fraction (e.g., 100% pulp, at least 90% pulp, at least 80% pulp, at least 70% pulp, etc.) to provide improved liquid handling characteristics. For example, wherever the wipe is loaded with a cleaning composition, such a tissue layer 107 may aid in wicking the cleaning composition more homogeneously across the full length and width of the wipe, as compared to absorption characteristics provided by melamine and/or synthetic nonwoven materials. Similarly, the wipe may be loaded with another suitable composition (e.g. water, solvent, fragrance, oils, waxes, emollients, any combinations thereof other suitable compositions) Pulp may be incorporated into the nonwoven layer(s) (e.g., providing a nonwoven that is a blend) to provide such benefits, as well. In another embodiment, at least one of the nonwoven layers may comprise such a tissue (e.g., pulp) material, providing better liquid handling characteristics.

It may be beneficial for such a pulp or tissue layer to be internal as shown, adjacent to the inner melamine sheet, rather than on an exterior surface, or present as a blended material layer for better durability. In one embodiment, the final wipe consists of a combination of three starting material sheets, a first nonwoven sheet, a melamine sheet and a second nonwoven sheet, where all three sheet materials are hydro-entangled together such that there are no distinct layers in the final wipe structure. In another embodiment of the invention, the final wipe consists of a combination of four starting material sheets a first nonwoven sheet, an absorbent sheet (e.g. tissue layer), a melamine sheet and a second nonwoven sheet, where all three sheets of material are hydro-entangled together such that there are no distinct layers in the final wipe structure. In further embodiment of the invention, the final wipe comprises a combination of at least three starting material sheets a first nonwoven sheet, an optional absorbent sheet (e.g. tissue layer), a melamine sheet and a second nonwoven sheet, where at least the melamine sheet and one of the nonwoven sheets are hydro-entangled together, the other nonwoven sheet and the absorbent sheet may be joined together to by another process (e.g. thermal bonding, embossing, adhesive, etc.) additional optional additional layers of materials may be added to the wipe (e.g. abrasive layers, sponges, woven materials, etc.).

IV. NonWoven or Other Fibrous Layer

While the above description generally describes use of a light-weight nonwoven material used to sandwich the melamine foam therebetween, which is then hydro-entangled to ensure that at least some of the melamine foam material protrudes through so as to be exposed on the exterior face(s) of the wipe or other substrate, it will be appreciated that a wide variety of fibrous materials (nonwovens and others) may be suitable for use in such methods.

In one embodiment, the substrate can comprise a woven or knitted layer. In one embodiment, the substrate of the present invention comprises a fibrous layer of nonwoven or paper substrate (e.g. tissue paper, paper towel, etc.). For simplicity, the term nonwoven is used herein, to broadly encompass both synthetic nonwoven substrates, paper substrates, blends thereof, as well as other similar substrates. The term is to be construed broadly, and includes substrates formed by any desired process (e.g., wet-laid, hydro-entangled, carded, thermally bonded, air-laid, and others). Such substrates may include synthetic fibers, pulp material, or blends. The term nonwoven includes articles defined according to the commonly known definition provided by the "Nonwoven Fabrics Handbook" published by the Association of the Nonwoven Fabric Industry, as well as paper substrates. As used herein, the term paper substrate includes articles defined by EDANA (note 1 of ISO 9092-EN 29092). Nonwoven substrates may not include woven fabric or cloth or sponge. The substrate can be partially or fully permeable to water. The substrate can be flexible and the substrate can be resilient, meaning that once applied external pressure has been removed the substrate regains its original shape. In an embodiment, at least one of the nonwoven layers could even be a "scrubby" layer, if desired. Alternatively, additional layers of materials may be subsequently added onto the melamine wipe as optional additional layers, such as a sponge, an abrasive layer, woven material, or the like. Furthermore, the melamine wipe may be attached to a suitable cleaning tool, such as a mop, toilet bowl cleaner, scrub brush, steam cleaner, shower squeegee, or other suitable cleaning tool, etc.

The substrate can comprise solely naturally occurring fibers, solely synthetic fibers, or any compatible combination of naturally occurring and synthetic fibers. The substrate can be composed of suitable unmodified and/or modified naturally occurring fibers including cotton, Esparto grass, bagasse, hemp, flax, silk, wool, wood pulp, chemically modified wood pulp, jute, ethyl cellulose, and/or cellulose acetate. Various pulp fibers can be utilized including, but not limited to, thermomechanical pulp fibers, chemithermomechanical pulp fibers, chemimechanical pulp fibers, refiner mechanical pulp fibers, stone groundwood pulp fibers, peroxide mechanical pulp fibers and the like.

Suitable synthetic fibers can comprise fibers of one, or more of polyvinyl chloride, polyvinyl fluoride, polytetrafluoroethylene, polyvinylidene chloride, polyacrylics such as ORLON®, polyvinyl acetate, Rayon®, polyethylvinyl acetate, non-soluble or soluble polyvinyl alcohol, polyolefins such as polyethylene (e.g., PULPEX®) and polypropylene, polyamides such as nylon, polyesters such as DACRON® or KODEL®, polyurethanes, polystyrenes, and the like, including fibers comprising polymers containing more than one monomer.

The polymers suitable for the present invention include polyolefins, polyesters, polyamides, polycarbonates, polyurethanes, polyvinylchloride, polytetrafluoroethylene, polystyrene, polyethylene terephathalate, biodegradable polymers such as polylactic acid and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly (1-butene) and poly(2-butene); polypentene, e.g., poly(1-pentene) and poly(2-pentene); poly(3-methyl-1-pentene); poly(4-methyl 1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof.

Many polyolefins are available for fiber production, for example polyethylenes such as Dow Chemical's ASPUN 6811A linear low-density polyethylene, 2553 LLDPE and 25355 and 12350 high-density polyethylene are such suitable polymers. Fiber forming polypropylenes include Exxon Chemical Company's ESCORENE PD3445 polypropylene. Many other polyolefins are commercially available and generally can be used in the present invention. The particularly preferred polyolefins are polypropylene and polyethylene.

Examples of polyamides and their methods of synthesis may be found in "Polymer Resins" by Don E. Floyd (Library of Congress Catalog number 66-20811, Reinhold Publishing, N.Y., 1966). Particularly commercially useful polyamides are nylon 6, nylon-6,6, nylon-11 and nylon-12. These polyamides are available from a number of sources such as Custom Resins, Nyltech, among others.

Multicomponent resins comprising two or more polymers can also be used. The particular polymers used for the different components of multicomponent fibers can have melting points different from one another. This can be important when through-air bonding is used as the bonding technique, wherein the lower melting polymer bonds the fibers together to form the fabric or web.

The disposable substrate can be formed by a number of different techniques including but not limited to using spunbonding, adhesive bonding, needle punching, ultrasonic bonding, thermal calendering and through-air bonding. Such a multilayer laminate may be an embodiment wherein some of the layers are spunbond and some meltblown such as a spunbond/meltblown/spunbond (SMS) laminate as disclosed in U.S. Pat. No. 4,041,203 to Brock et al. and U.S. Pat. No. 5, 169,706 to Collier, et al., each hereby incorporated by reference.

The fibers of the fibrous layer (e.g., nonwoven) can be hydrophilic, hydrophobic or can be a combination of both hydrophilic and hydrophobic fibers. The particular selection of hydrophilic or hydrophobic fibers depends upon the other materials included and the desirable functional aspects of the substrate. Suitable hydrophilic fibers for use in the present invention include cellulosic fibers, modified cellulosic fibers, rayon, cotton, and polyester fibers such as hydrophilic nylon (HYDROFIL®). Suitable hydrophilic fibers can also be obtained by hydrophilizing hydrophobic fibers, such as surfactant-treated or silica-treated thermoplastic fibers derived from, for example, polyolefins such as polyethylene or polypropylene, polyacrylics, polyamides, polystyrenes, polyurethanes and the like.

Methods of making nonwovens are well known in the art, and it will be apparent that a wide variety of nonwovens or other fibrous layers may be suitable for use in the present methods. While not an exhaustive listing, nonwovens can be made by air-laying, wet-laying, meltblowing, coforming, spunbonding, or carding processes in which the fibers or filaments are first cut to desired lengths from long strands, passed into a water or air stream, and then deposited onto a screen through which the fiber-laden air or water is passed. Wet-laid processes are described in U.S. Pat. Nos. 5,246,772 and 5,238,534 to Manning. Air-laying processes are described in U.S. Patent Publication No. 2003/0036741 to Abba et al. and U.S. Patent Publication No. 2003/0118825 to Melius et al. The resulting layer, regardless of its method of production or composition, is then subjected to at least one of several types of bonding operations to anchor the individual fibers together to form a self-sustaining substrate. In the present invention the nonwoven substrate can be prepared by a variety of processes including, but not limited to, spunbonding, air-entanglement, hydro-entanglement, thermal bonding, and combinations of these processes, as will be appreciated by those of skill in the art.

In one embodiment, the dry fibrous web of a nonwoven or other fibrous layer can comprise wood pulp fibers. The following patents are incorporated herein by reference for their disclosure related to such fibrous layer webs: U.S. Pat. Nos. 3,862,472; 3,982,302; 4,004,323; 4,057,669; 4,097,965; 4,176,427; 4,130,915; 4,135,024; 4,189,896; 4,207,367; 4,296,161; 4,309,469; 4,682,942; 4,637,859; 5,223,096; 5,240,562; 5,556,509; and 5,580,423.

The wipe or other disposable cleaning substrate described herein can be used as a pre-moistened substrate, as a dry substrate, or in combination with a cleaning implement as described herein. Thus, the disposable cleaning substrate includes cleaning pads attachable to cleaning implements.

The size and shape of the wipe or other cleaning substrate can vary with respect to the intended application and/or end use of the same. The cleaning substrate can have a substantially rectangular shape of a size that allows it to readily engage standard cleaning equipment or tools such as, for example, mop heads, duster heads, brush heads and so forth. As one particular example, in order to fit a standard mop head, the cleaning wipe can have a length of about 28 cm and a width of about 22 cm. However, the particular size and/or shape of cleaning substrate can vary as needed to fit upon or otherwise conform to a specific cleaning tool. In an alternative configuration, the cleaning substrate of the present invention could be formed into a mitten shaped article for wiping and cleaning, which would fit over the user's hand.

The wipes or other cleaning substrates can be provided dry or pre-moistened. In one aspect, dry cleaning substrates can be provided with dry or substantially dry cleaning or disinfecting agents coated on or in the wipe. In addition, the cleaning substrates can be provided in a pre-moistened and/or saturated condition. The wet cleaning substrates can be maintained over time in a sealable container such as, for example, within a bucket with an attachable lid, sealable plastic pouches or bags, canisters, jars, tubs and so forth. Desirably the wet, stacked cleaning substrates are maintained in a resealable container. The use of a resealable container is particularly desirable when using volatile liquid compositions since substantial amounts of liquid can evaporate while using the first sheets thereby leaving the remaining sheets with little or no liquid. Exemplary resealable containers and dispensers include, but are not limited to, those described in U.S. Pat. No. 4,171,047 to Doyle et al., U.S. Pat. No. 4,353,480 to McFadyen, U.S. Pat. No. 4,778,048 to Kaspar et al., U.S. Pat. No. 4,741,944 to Jackson et al., U.S. Pat. No. 5, 595,786 to McBride et al.; the entire contents of each of the aforesaid references are incorporated herein by reference.

With regard to pre-moistened substrates, a selected amount of liquid is added to the container such that the cleaning substrates contain the desired amount of liquid. Typically, the cleaning substrates are stacked and placed in the container and the liquid subsequently added thereto. The substrate can subsequently be used to wipe a surface as well as act as a vehicle to deliver and apply cleaning liquids to a surface. The moistened and/or saturated cleaning substrates can be used to treat various surfaces. As used herein "treating" surfaces is used in the broad sense and includes, but is not limited to, wiping, polishing, swabbing, cleaning, washing, disinfecting, scrubbing, scouring, sanitizing, and/or applying active agents thereto. The amount and composition of the liquid added to the cleaning wipes will vary with the desired application and/or function of the substrates. As used herein the term "liquid" includes, but is not limited to, solutions, emulsions, suspensions and so forth. Thus, liquids may comprise and/or contain one or more of the following: disinfectants; antiseptics; diluents; surfactants, such as nonionic, anionic, cationic, waxes; antimicrobial agents; sterilants; sporicides; germicides; bactericides; fungicides; virucides; protozoacides; algicides; bacteriostats; fungistats; virustats; sanitizers; antibiotics; pesticides; and so forth. Numerous cleaning compositions and compounds are known in the art and can be used in connection with the present invention. For example, the wipes may be provided in a substantially dry form, or may be pre-loaded (e.g., dosed) with a cleaning composition. Examples of such compositions include, but are not limited to U.S. Pat. Nos. 8,648,027; 9,006,165; 9,234,165, and U.S. Publication No. 2008/003906 each of which is herein incorporated by reference in its entirety.

The wipes or other cleaning substrates of the present invention can be provided in a kit form, wherein a plurality of cleaning substrates and a cleaning tool are provided in a single package.

In addition to material composition, wipe or other substrate dimension can also be used to control dosing as well as provide ergonomic appeal. In one embodiment, substrate dimensions are from about 5½ inches to about 9 inches in length, and from about 5½ inches to about 9 inches in width to comfortably fit in a hand. As such, the substrate can have dimensions such that the length and width differ by no more than about 2 inches. In the context of heavier soil cleaning, substrates can be bigger so that they can used and then folded, either once or twice, so as to contain dirt within the inside of the fold and then the wipe can be re-used. For this application, the substrate can have a length from about 5½ inches to about 13 inches and a width from about 10 inches to about 13 inches. As such, the substrate can be folded once or twice and still fit comfortably in the hand.

V. SEM Images of Prototype Production Wipes

Figure 2A:
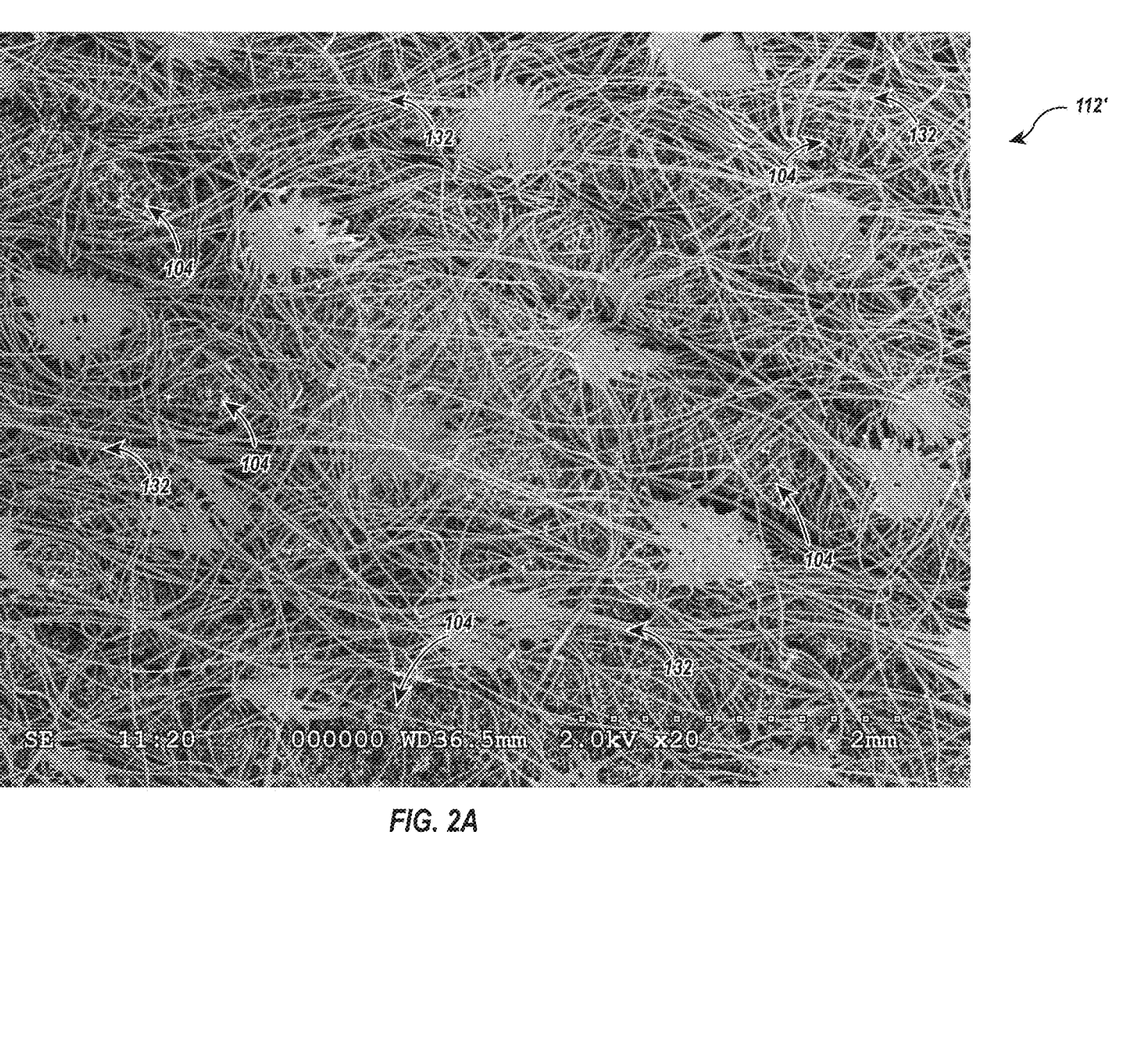
FIGS. 2A-2B are SEM images of exemplary wipes formed according to the present invention, showing the exposed faces thereof, magnified 20× and 25×, respectively.

FIGS. 2A-5B show SEM images of exemplary wipes formed by the presently described methods in which melamine is sandwiched between nonwoven materials. FIGS. 2A-2B illustrate such a resulting wipe 112' which begins as initially sandwiched layers 108 of a nonwoven (e.g., spunbond polypropylene) as upper and lower layers 108a, 108b, with a melamine layer 104 therebetween. Upon hydro-entangling, the resulting wipe 112' is no longer a sandwich structure with distinct individual layers, but includes a structure in which the melamine 104 has become entangled into the light, relatively thin nonwoven layers 108 to such a degree that portions of the melamine 104 are actually exposed on the exterior face(s) of wipe 112'. FIGS. 2A-2B are SEM images of such an exterior face 132. The spaghetti-like stringy structure seen in FIGS. 2A-2B is the nonwoven material (e.g., 108a), while the melamine foam material 104 is seen at various locations (somewhat randomly) along face 132, exposed through nonwoven material 108a.

Figure 2B:
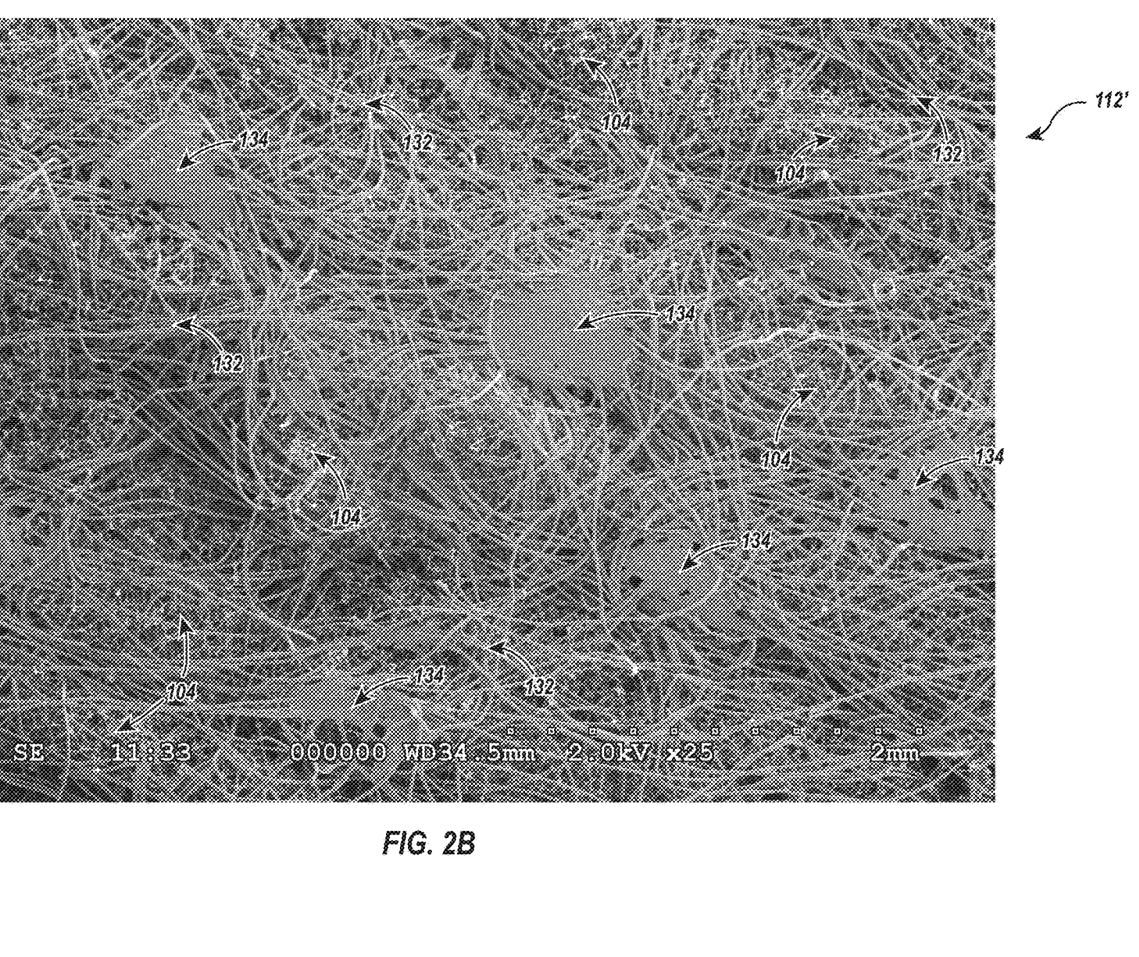

Also visible in FIGS. 2A-2B are regions 134 where nonwoven material 108a has been thermally bonded, and exhibits melting, where the spunbond material 108a has been melted together, forming random "patches" of melted nonwoven fibers along the face 132. Such melted patches 134 may exhibit average sizes of 0.1 mm to 2 mm, 0.2 mm to 1 mm, or 0.5 mm to 1 mm in width. Patches of exposed melamine 104, as seen in FIGS. 2A-2B may be on a similar or somewhat smaller scale (e.g., patches of exposure having average dimensions from 0.05 mm to 1 mm, 0.1 mm to 0.8 mm, or 0.2 mm to 0.5 mm).

Such thermally bonded patches 134 may result where a process by which the nonwoven material is formed employs thermal bonding, e.g., to aid in tacking or adhering the spaghetti-like strands of the nonwoven structure together.

It will be apparent from FIGS. 2A-2B that the melamine 104 does not form the entirety of an exterior face of wipe 112', but that rather the face 132 is generally provided by the nonwoven layer (e.g., 108a or 108b), but that patches or portions of melamine 104 protrude though nonwoven layer 108a and/or 108b so as to exposed on the exterior face 132. While the majority of the face 132 may thus be provided by the nonwoven layers 108, a portion of the melamine 104 is entangled into, and protrudes through so as to be exposed on exterior face 132. The practical result of such during use of the wipe is that the wipe exhibits far greater durability than a cleaning article in which the entire exterior surface is melamine (e.g., such as a melamine sponge). Such melamine sponges are not particularly durable, and abrade away relatively quickly. The present wipe structures instead include a thin and light nonwoven layer (108a or 108b) that generally provides the exterior face 132 of the cleaning article 112', but in which melamine portions or patches are exposed through the nonwoven layer, so that the cleaning article 112' does exhibit the cleaning benefits associated with melamine, but in a structure that is far more durable, while also exhibiting drapability as a thin wipe, rather than a non-drapable sponge article.

The nonwoven strands thus provide some degree of protection to adjacent melamine structures, allowing the melamine to be used to scrub (e.g., remove crayon marks, scuff marks, and the like), while being protected to some degree from abrading away by the nearby nonwoven strands of nonwoven material 108a, 108b.

Figure 3A:
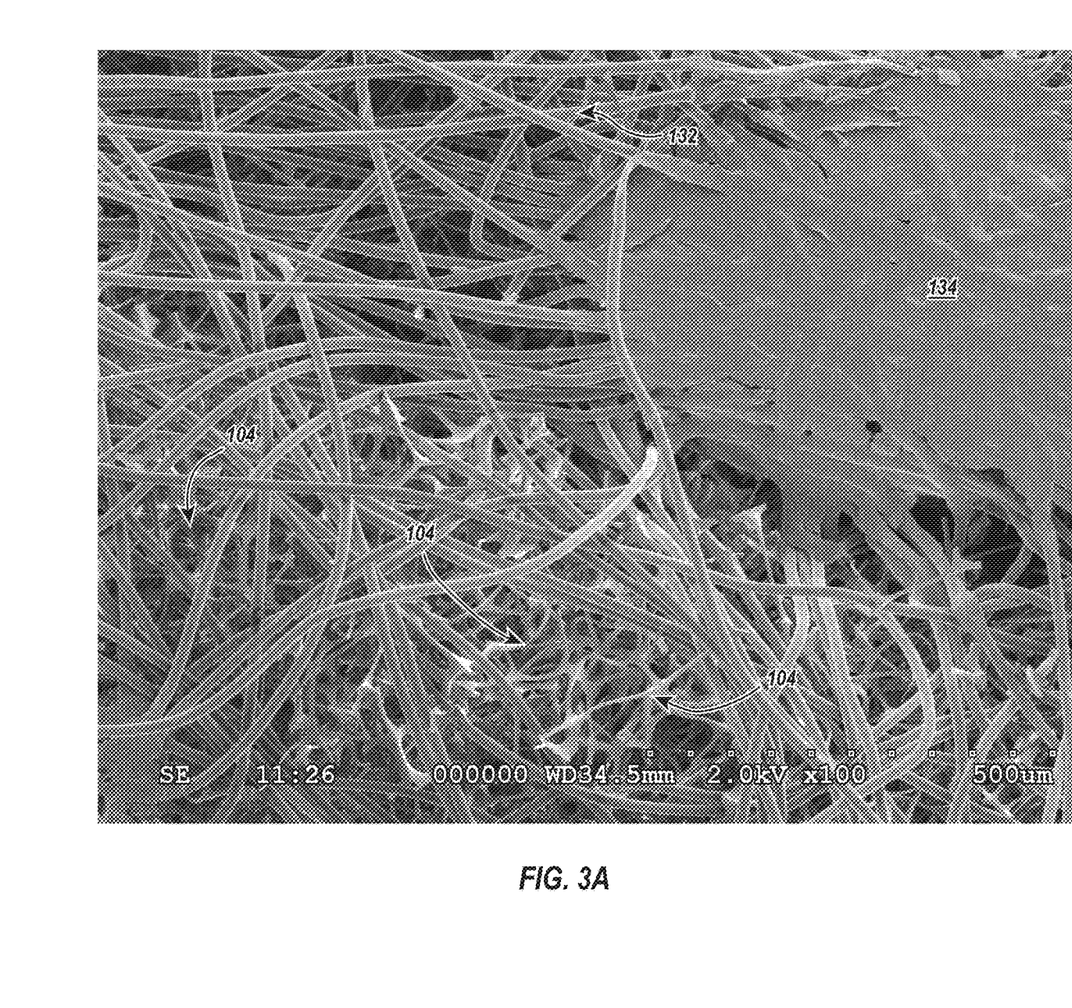
FIGS. 3A-3B are SEM images of exemplary wipes formed according to the present invention, showing the exposed faces thereof, magnified 100×.
Figure 3B:
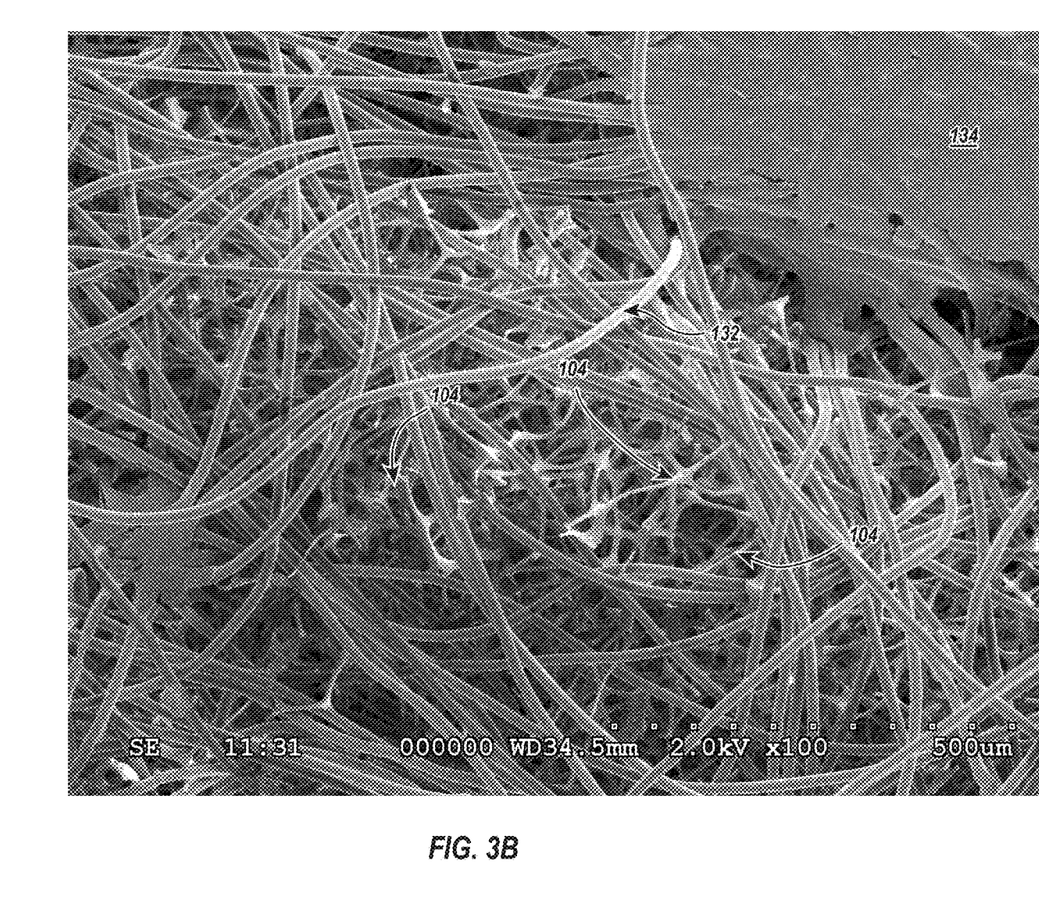

FIGS. 3A-3B similar show SEM images of the face 132 of wipe 112', but at a higher degree of magnification than that seen in FIGS. 2A-2B. FIG. 3A shows the relative scale of a typical thermally bonded region 134 of the nonwoven material 108, as compared to the size of typical exposed portions of melamine 104.

Figure 4:
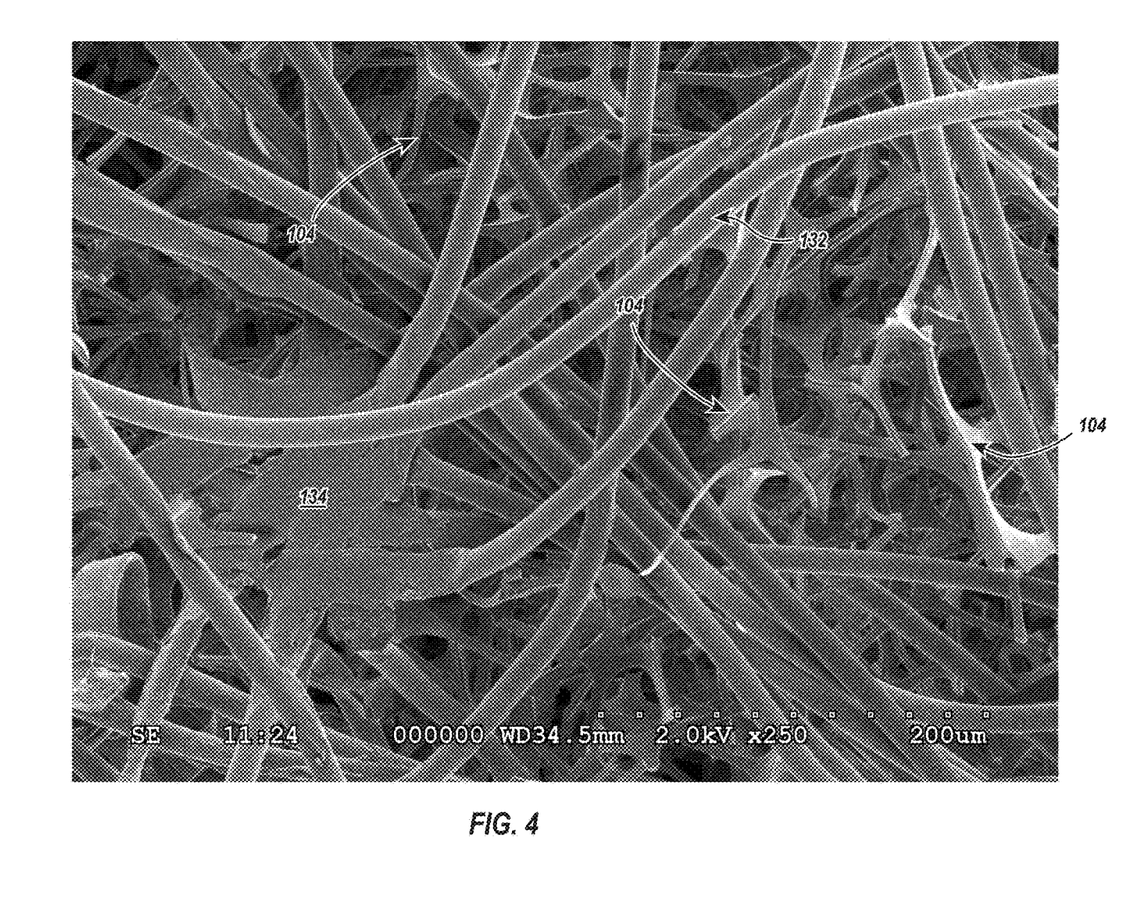
FIG. 4 is an SEM image of an exemplary wipe formed according to the present invention, showing an exposed face thereof, magnified 250×.

FIG. 4 is similar to FIGS. 3A-3B, but shows an area of face 132 at an even higher magnification.

As will be apparent from the SEM images, while a portion of melamine 104 is exposed at face 132, there is additional melamine 104 that resides just below the exposed face 132 (e.g., only slightly recessed below perhaps a single strand or a few strands of nonwoven material 108, but which recessed melamine can be forced to the exposed face e.g., by compressing wipe 112', such as may be typical during usage. The ability of such nearly exposed melamine to become exposed and available for abrasion may result from the particular nonwoven material and its characteristics, selected. For example, the nonwoven material layers 108a, 108b may be very thin and lightweight, providing numerous openings through the given layer between adjacent nonwoven strands or fibers for passage or protrusion of melamine 104. By way of example, at least one of nonwoven layers 108 (e.g., 108a and/or 108b) may have a weight of no more than 50 gsm, no more than 40 gsm, no more than 30 gsm, or no more than 20 gsm. The examples seen in the SEM images included a spunbond polypropylene material, with a weight of only 10 gsm. Such a layer may typically have a thickness from 0.001 inch to 0.005 inch, from 0.0015 inch to 0.004 inch, or from 0.002 to 0.003 inch. Fiber denier may typically be from 0.5 to 10 denier, from 0.8 denier to 5 denier, or from 1 to 3 denier.

The melamine layer may have an initial thickness from 0.01 inch to 0.5 inch, from 0.05 inch to 0.5 inch, or from 0.05 inch to 0.04 inch. Examples of wipes produced included initial melamine thicknesses of 0.0625 inch, 0.125 inch, 0.25 inch, and 0.5 inch. Preferably, the initial melamine layer has a thickness from 0.0625 inch to 0.5 inch, or less than 0.5 inch (e.g., 0.0625 inch to 0.25 inch). Upon processing according to the presently disclosed methods, significant compression of the melamine layer was observed. For example, the nonwoven thickness may itself be nearly negligible (e.g., 0.004 in-0.008 in) relative to that of the melamine, with the final wipe having a thickness from 0.01 inch to 0.125 inch, or 0.01 inch to 0.05 inch. By way of example, a wipe formed with 10 gsm nonwoven layers and a 0.25 inch thick melamine layer may have a final wipe thickness of only about 0.05 inch (e.g., 1.25 mm to 1.37 mm), as the melamine is compressed to a large degree.

Because of the light-weight characteristics of the nonwoven layers 108a, 108b, the melamine material 104 may account for the majority of the weight of the dry wipe or other substrate 112'. For example, the melamine 104 may account for at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% of the dry weight of the wipe or other substrate 112'. Of course, where the wipe is dosed with a cleaning composition, the cleaning composition may typically account for a majority of the "wet" wipe weight.

Figure 5A:
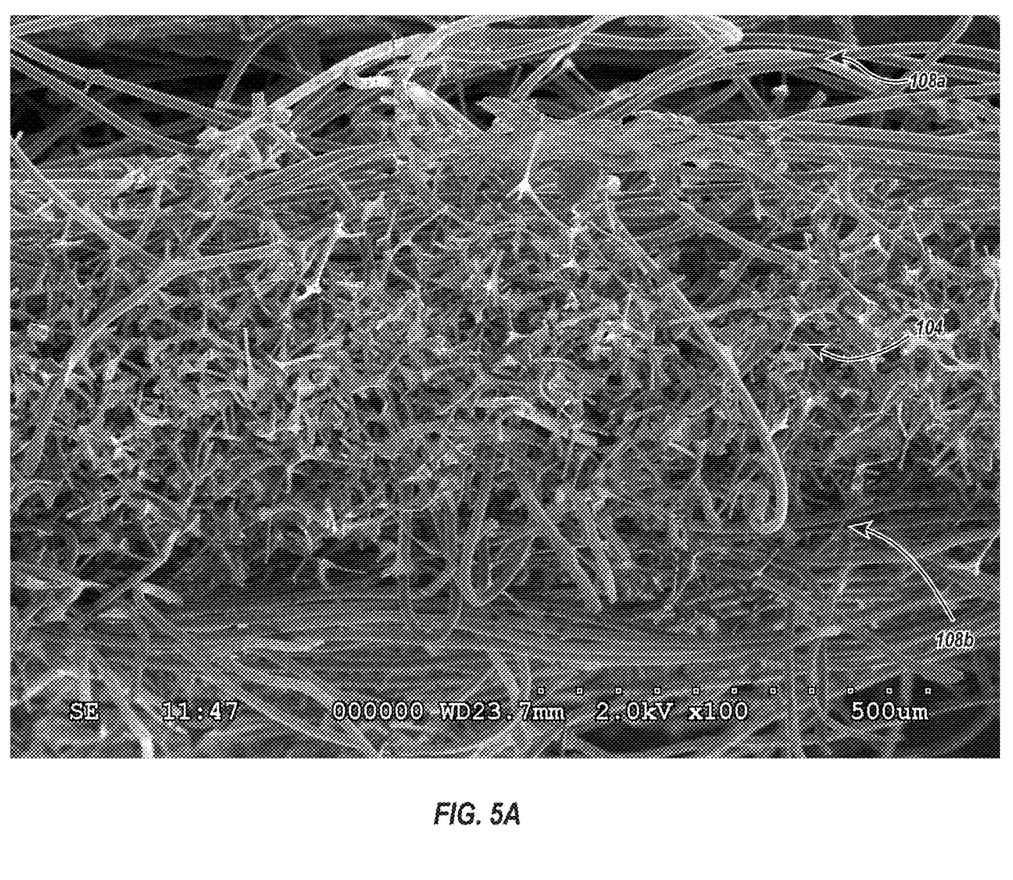
FIGS. 5A-5B are SEM images of exemplary wipes formed according to the present invention, showing cross-sections therethrough, magnified 100×.
Figure 5B:
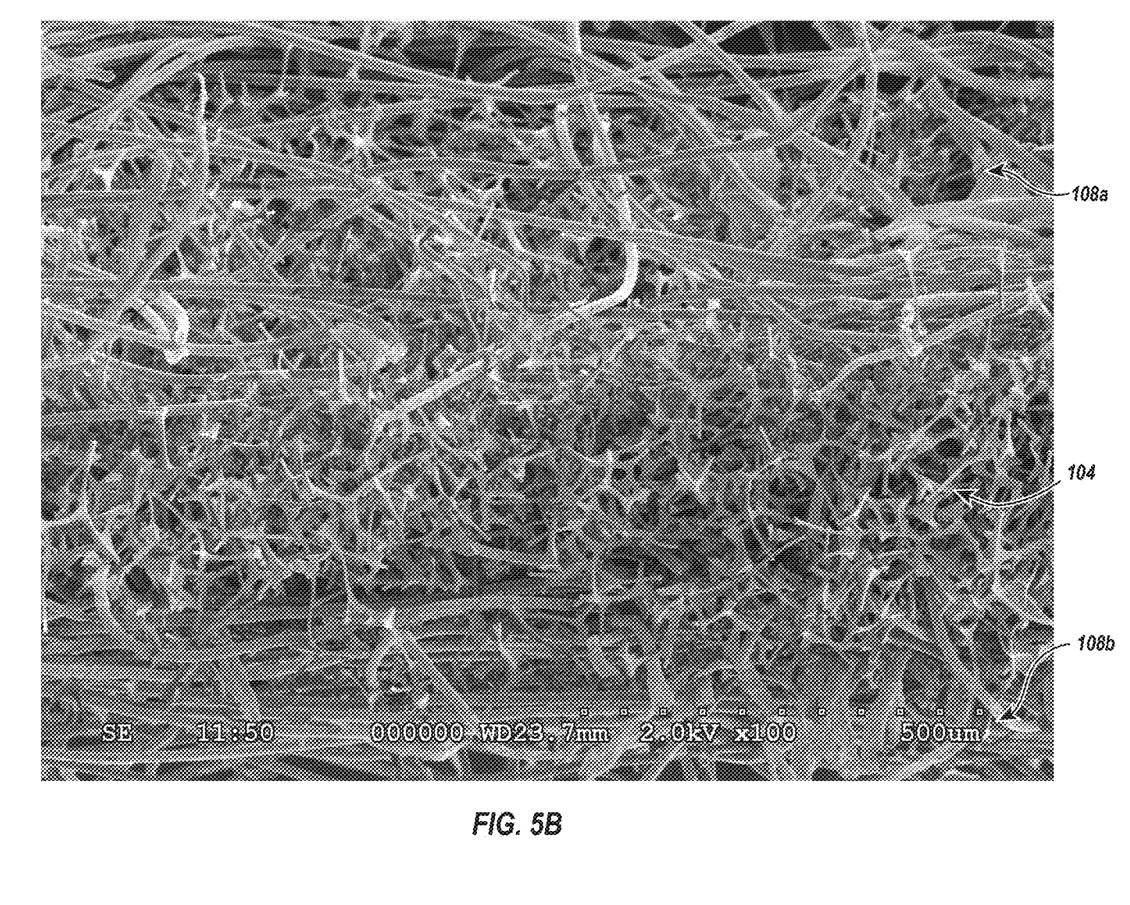

FIGS. 5A-5B show cross-section SEM images through wipe 112', showing how the majority of the melamine material 104 is disposed in the core of the sandwich structure, but in which some portions of melamine material 104 protrude not only into but through thin, light-weight, and relatively open nonwoven layer 108a, 108b. Because of such exteriorly protruding characteristics, and the light-weight, open characteristics of nonwoven layers 108a, 108b, a significant portion of the exterior face of wipe 112' that contacts a surface being cleaned (e.g., a tabletop, countertop, wall, door, baseboard, or the like) is comprised of melamine 104. Such exposure of melamine in the exterior face 132 allows the melamine to contribute in a significant way to the cleaning characteristics provided by the wipe, as compared to a structure in which melamine may be present, but in which it is entirely or largely only present in a core layer, distinct and separate, so as to not be exposed to any appreciable degree at the exterior face of the cleaning article.

Figure 6A:
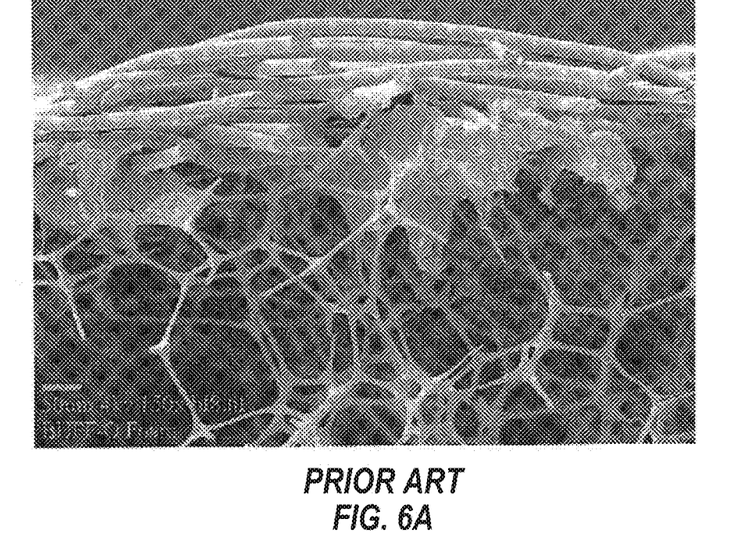
FIGS. 6A-6B are SEM images of cross-sections of prior art comparative articles formed according to U.S. Pat. No. 7,629,043, magnified 150×, including a melamine foam layer bonded to a spunbond layer using a meltblown adhesive material.
Figure 6B:
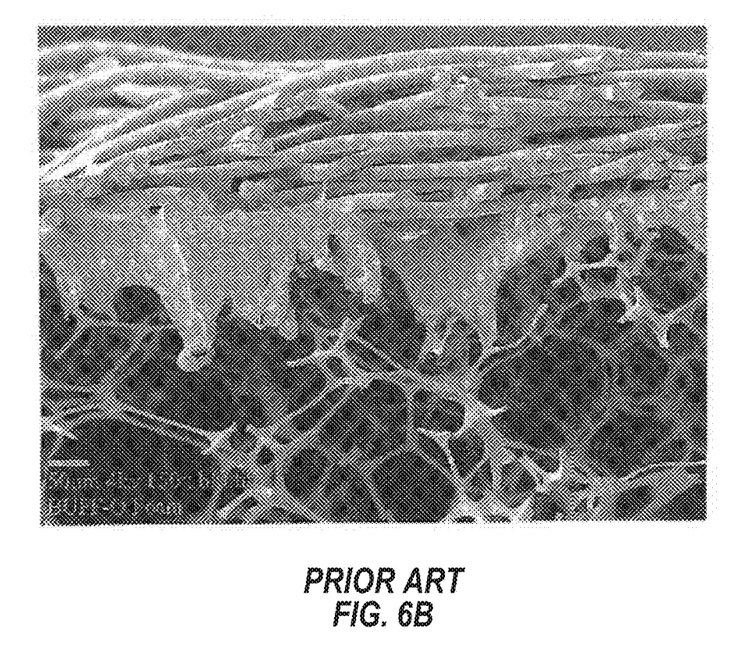

FIGS. 6A-6B reproduce FIGS. 26 and 27 from U.S. Pat. No. 7,629,043, which shows an isolated, interior melamine foam layer bonded to a spunbond web using a meltblown adhesive material seen between the relatively thick exterior sponbond web layer and the internal melamine foam layer. Such structure provides little to no cleaning characteristics associated with melamine, as the melamine is not exposed on an exterior face, to any appreciable degree, if at all. While such a structure may provide a spongy core, it does not provide any of the abrasivity cleaning benefits of melamine, as no melamine is exposed.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A method for manufacturing a wipe comprising melamine and nonwoven components the method comprising:
   (a) providing a melamine sheet;
   (b) providing first and second nonwoven sheets;
   (c) positioning the melamine sheet between the first and second nonwoven sheets;
   (d) hydro-entangling the melamine sheet and at least one of the nonwoven sheets such that the melamine and at least one of the nonwoven sheets are entangled together, such that a portion of the melamine is exposed on an exterior face of the wipe generally provided by the nonwoven sheets.

2. The method of claim 1, wherein the first and second nonwoven sheets are spunbond.

3. The method of claim 1, wherein the wipe has a thickness of less than 0.125 inch and is drapable.

4. The method of claim 3, wherein the melamine sheet has an initial thickness as provided that is greater than a thickness of the finished wipe.

5. The method of claim 4, wherein the melamine sheet has an initial thickness from 0.0625 inch to 0.5 inch, and the melamine sheet becomes compressed during the manufacturing method, wherein the thickness of the finished wipe is from 0.01 inch to 0.05 inch.

6. The method of claim 1, wherein the hydro-entangling is performed at a pressure of at least about 100 bars.

7. The method of claim 6, the method further comprising pre-wetting the melamine and the nonwoven prior to hydro-entangling, the pre-wetting being at a pressure insufficient to hydro-entangle the melamine into the nonwoven.

8. The method of claim 7, wherein the pre-wetting is performed at a pressure of about 25 bars.

9. The method of claim 1, wherein the melamine sheet is contiguous, such that the wipe is substantially void of separated particles of melamine.

10. The method of claim 1, wherein the melamine sheet is hydro-entangled into both of the first and second nonwoven sheets, such that a portion of the melamine is exposed on both exterior faces of the wipe.

11. The method of claim 1, the method further comprising drying the wipe after hydro-entangling.

12. The method of claim 1, wherein the nonwoven sheets are provided as a roll, and the melamine is provided in the form of sheets or rolled sheets, wherein the nonwoven roll and the melamine sheets or rolled sheets are of substantially the same width.

13. The method of claim 1, the method further comprising providing a tissue layer within the wipe.

14. A method for manufacturing a wipe comprising melamine and nonwoven components, the method comprising:
   (a) providing a melamine sheet in which the melamine is provided as a contiguous sheet, rather than in the form of discrete melamine particles;
   (b) providing first and second nonwoven sheets;
   (c) positioning the melamine sheet between the first and second nonwoven sheets;
   (d) hydro-entangling the melamine sheet into both of the nonwoven sheets such that the melamine is entangled through both of the nonwoven sheets, such that a portion of the melamine is exposed on both exterior faces of the wipe generally provided by the nonwoven sheets, wherein the hydro-entangling is performed at a pressure of at least about 150 bars.

15. The method of claim 14, wherein the first and second nonwovensheets are spunbond.

16. The method of claim 14, wherein the wipe has a thickness of less than 0.25 inch and is drapable.

17. The method of claim 14, the method further comprising pre-wetting the melamine and the nonwoven prior to hydro-entangling, the pre-wetting being at a pressure insufficient to hydro-entangle the melamine into the nonwoven.

18. The method of claim 14, the method further comprising drying the wipe after hydro-entangling.

* * * * *